(12) United States Patent
Seder et al.

(10) Patent No.: US 10,114,217 B2
(45) Date of Patent: Oct. 30, 2018

(54) SOLAR LOAD MANAGING HEAD-UP DISPLAY SYSTEM AND DEVICE

(71) Applicant: GM GLOBAL TECHNOLOGY OPERATIONS LLC, Detroit, MI (US)

(72) Inventors: Thomas A. Seder, Fraser, MI (US); Leslie G. Ferris, Clinton Township, MI (US); James A. Carpenter, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 94 days.

(21) Appl. No.: 15/440,108

(22) Filed: Feb. 23, 2017

(65) Prior Publication Data

US 2018/0239133 A1     Aug. 23, 2018

(51) Int. Cl.
| | |
|---|---|
| *G02B 27/01* | (2006.01) |
| *G02B 27/00* | (2006.01) |
| *G02B 1/118* | (2015.01) |
| *G02B 5/30* | (2006.01) |
| *G02F 1/13363* | (2006.01) |
| *G02F 1/1335* | (2006.01) |

(52) U.S. Cl.
CPC .......... *G02B 27/0101* (2013.01); *G02B 1/118* (2013.01); *G02B 5/3033* (2013.01); *G02B 5/3083* (2013.01); *G02B 27/0018* (2013.01); *G02B 27/0149* (2013.01); *G02F 1/13363* (2013.01); *G02F 1/133536* (2013.01); *G02B 2027/012* (2013.01); *G02B 2207/109* (2013.01); *G02F 2001/133638* (2013.01)

(58) Field of Classification Search
CPC ............ G02B 27/0101; G02B 27/0149; G02B 27/0018; G02B 1/118; G02B 5/3083; G02F 1/13363; G02F 2001/133638
See application file for complete search history.

(56) References Cited

U.S. PATENT DOCUMENTS

| | | | |
|---|---|---|---|
| 6,359,737 B1 * | 3/2002 | Stringfellow ...... | G02B 27/0101 250/214 VT |
| 2013/0279016 A1 * | 10/2013 | Finger ................ | G02B 5/30 359/630 |
| 2014/0177040 A1 * | 6/2014 | Uehara .............. | G02B 27/0101 359/352 |
| 2017/0336642 A1 * | 11/2017 | Mermillod ......... | G02B 27/0179 |

* cited by examiner

*Primary Examiner* — Jia Pan
(74) *Attorney, Agent, or Firm* — Harness, Dickey & Pierce, P.L.C.

(57) ABSTRACT

A head-up display system includes a housing, a liquid crystal display disposed within the housing and configured for emitting a first ray of light, and a reflector stack disposed adjacent the liquid crystal display within the housing. The reflector stack is configured for transmitting therethrough the first ray of light and includes a retardation plate and an optical film disposed on the retardation plate and facing the liquid crystal display. The head-up display system also includes a radiative heat sink disposed on the housing and a turn mirror spaced apart from the reflector stack. The turn mirror is configured for directing a first solar ray to the reflector stack such that the first solar ray reflects off the reflector stack to the radiative heat sink as a second solar ray.

20 Claims, 3 Drawing Sheets

SOLAR LOAD MANAGING HEAD-UP DISPLAY SYSTEM AND DEVICE

INTRODUCTION

The present disclosure relates to a head-up display system and a device.

A head-up display or HUD is a transparent display that presents data to an operator of a device, such as a vehicle or a component, without requiring the operator to look away from a given field of view. For example, a HUD for an automotive vehicle may present speedometer data, tachometer data, fuel level data, and/or navigational data to a driver as the driver looks straight ahead through a windshield of the automotive vehicle. Similarly, a HUD for an aircraft may present altitude, airspeed, heading, and/or a horizon line to a pilot as the pilot looks straight ahead through a windshield or canopy of the aircraft. Likewise, a HUD for a helmet, visor, goggles, or eyeglasses may present images and/or text to a wearer through a lens of the helmet, visor, goggles, or eyeglasses.

SUMMARY

A head-up display system includes a housing, a liquid crystal display disposed within the housing and configured for emitting a first ray of light, and a reflector stack disposed adjacent the liquid crystal display within the housing. The reflector stack is configured for transmitting therethrough the first ray of light and includes a retardation plate and an optical film. The optical film is disposed on the retardation plate and faces the liquid crystal display. The head-up display system also includes a radiative heat sink disposed on the housing and a turn mirror spaced apart from the reflector stack. The turn mirror is configured for directing a first solar ray to the reflector stack such that the first solar ray reflects off the reflector stack to the radiative heat sink as a second solar ray.

In one aspect, the optical film abuts the liquid crystal display such that the liquid crystal display and the reflector stack do not define an air gap therebetween. The optical film may be a reflective polarizer film.

The radiative heat sink may absorb the second solar ray such that the turn mirror reflects only the first solar ray and the first ray of light. That is, the second solar ray may not reflect off the turn mirror. The radiative heat sink may be formed from a plurality of carbon nanotubes each extending from the housing and aligned parallel to one another.

In one embodiment, the reflector stack is spaced apart from the liquid crystal display to define an air gap therebetween, and a squelching material is disposed within the air gap. For this embodiment, the turn mirror is spaced apart from the reflector stack and is configured for directing a first solar ray to the reflector stack such that the first solar ray reflects off the reflector stack to the radiative heat sink as a second solar ray. The turn mirror is also configured for directing a third solar ray through the reflector stack to the squelching material such that the third solar ray reflects off the squelching material to the radiative heat sink as a fourth solar ray.

In one aspect, the optical film may be a reflective polarizer film. In another aspect, the optical film may be a linear polarizer.

In a further aspect, the squelching material may be an index matching gel. In addition, the liquid crystal display may have a first surface facing the reflector stack and configured for emitting the first ray of light. The squelching material may be disposed on the first surface and the optical film.

In yet another aspect, the squelching material may be a cured film formed from an anti-reflection coating composition. The cured film may have a thickness of from 35 μm to 65 μm and may have a moth-eye structure including a plurality of peaks and a plurality of troughs defined between adjacent ones of the plurality of peaks. The cured film may be configured for minimizing reflection of the first ray of light from the first surface and may eliminate double reflection of the first solar ray.

A device includes a windshield, an operator eyebox spaced apart from the windshield, and a head-up display system configured for producing only a primary image visible at the windshield when viewed from the operator eyebox without producing a ghost image offset from the primary image. The head-up display system includes a housing, a liquid crystal display disposed within the housing and configured for emitting a first ray of light, and a reflector stack disposed adjacent the liquid crystal display within the housing. The reflector stack is configured for transmitting therethrough the first ray of light and includes a retardation plate and an optical film disposed on the retardation plate and facing the liquid crystal display. The head-up display system also includes a radiative heat sink disposed on the housing and a turn mirror spaced apart from the reflector stack. The turn mirror is configured for directing a first solar ray to the reflector stack such that the first solar ray reflects off the reflector stack to the radiative heat sink as a second solar ray.

In one aspect, the second solar ray may not reflect off the turn mirror, and the second solar ray may not reflect off the radiative heat sink to the operator eyebox.

In another aspect, the device may have a lowest surface and the operator eyebox may have a top and a bottom disposed between the top and the lowest surface. The second solar ray may not be visible at the windshield when viewed from the top of the operator eyebox.

In a further aspect, the optical film may abut the liquid crystal display such that the liquid crystal display and the reflector stack do not define an air gap therebetween. In yet another aspect, the reflector stack may be spaced apart from the liquid crystal display to define an air gap therebetween. The head-up display system may further include a squelching material disposed within the air gap.

The above features and advantages and other features and advantages of the present disclosure are readily apparent from the following detailed description of the best modes for carrying out the disclosure when taken in connection with the accompanying drawings.

DETAILED DESCRIPTION

Figure 1:
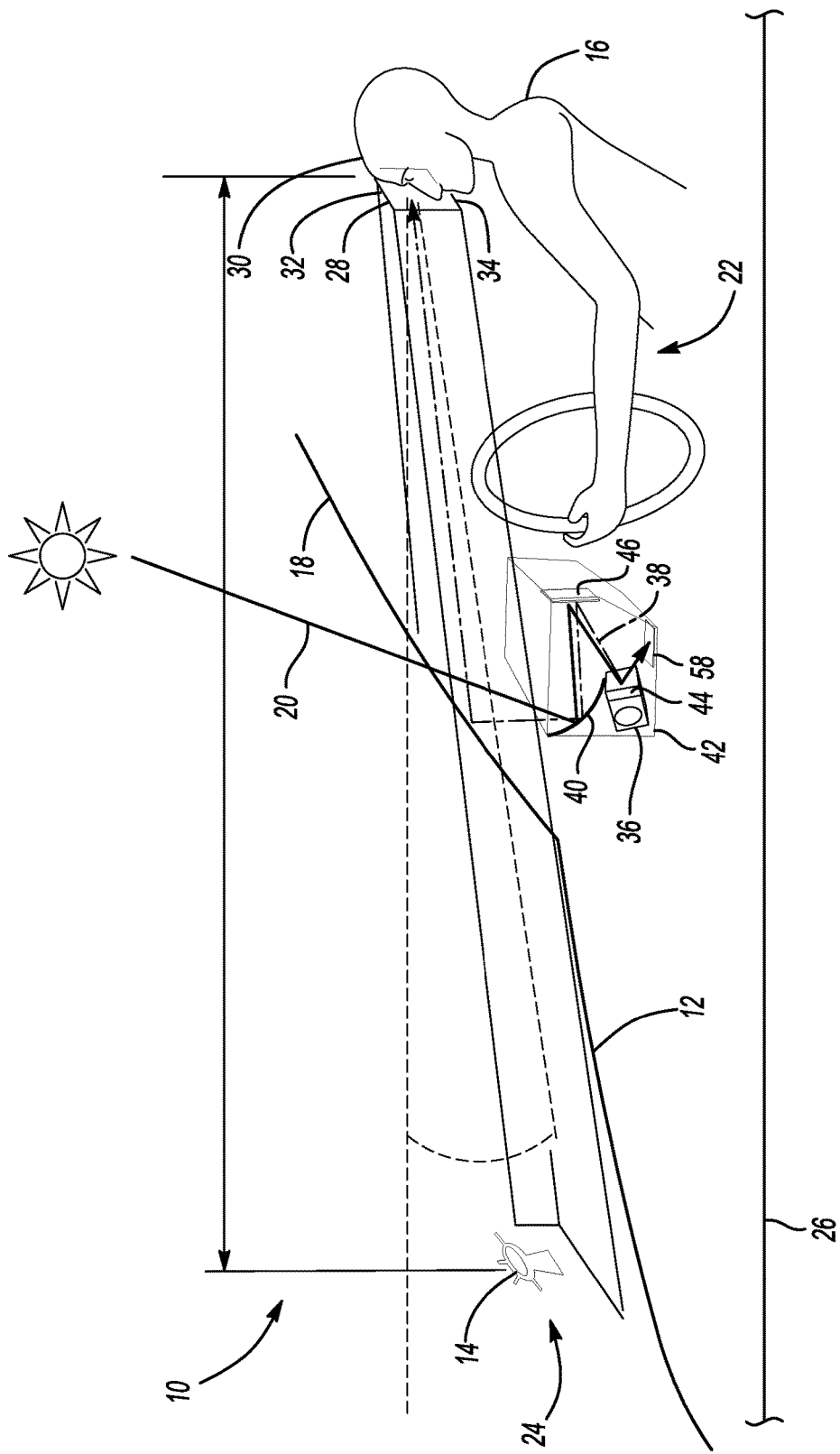
FIG. 1 is a schematic illustration of a side view of a device including a head-up display system.
Figure 2:
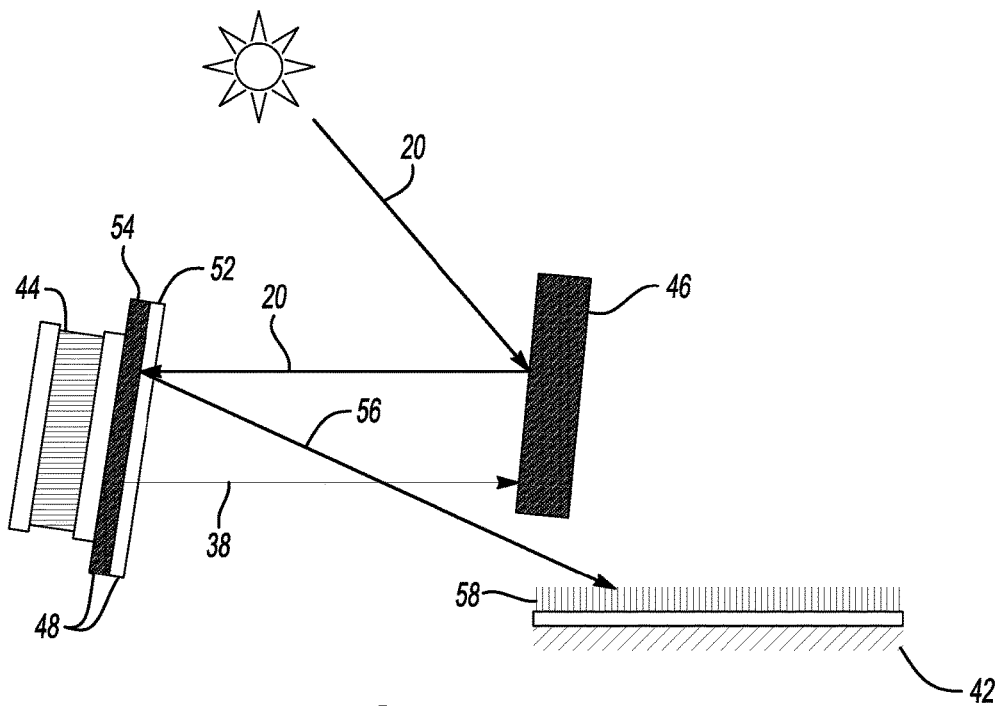
FIG. 2 is a schematic illustration of a side view of a liquid crystal display, reflector stack, and turn mirror of the head-up display system of FIG. 1.
Figure 3:
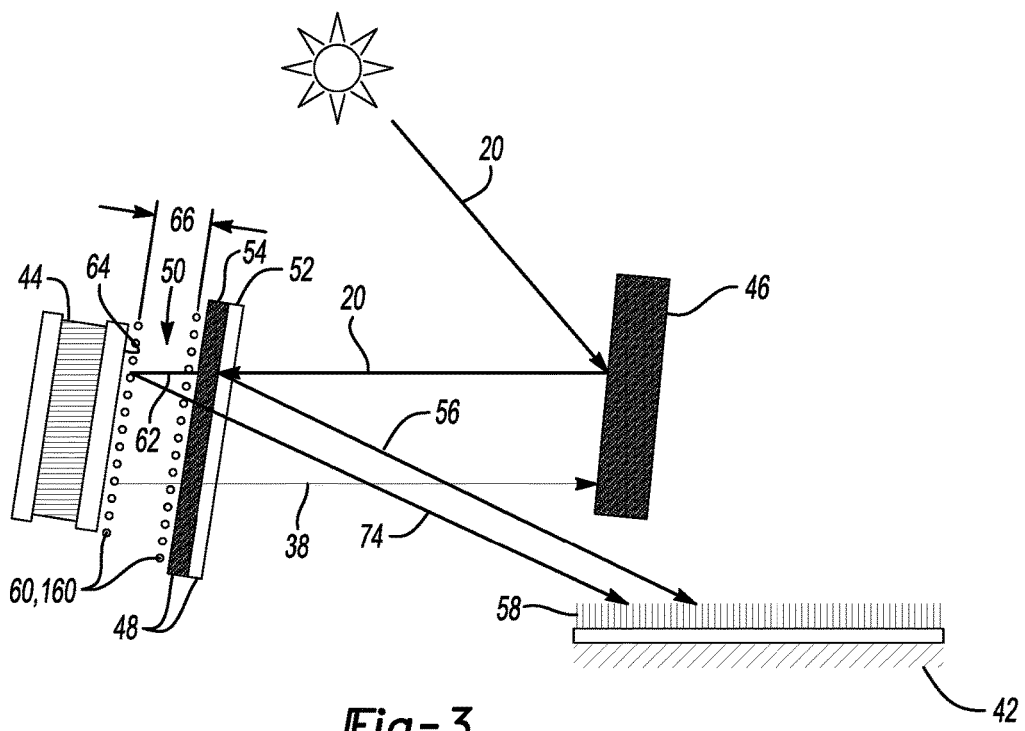
FIG. 3 is a schematic illustration of a side view of another embodiment of the head-up display system of FIGS. 1 and 2.

Referring to the Figures, wherein like reference numerals refer to like elements, a head-up display system 10 for a device 12 is shown generally in FIGS. 1-3. The head-up display system 10 may be useful for presenting data such as a primary image 14 to an operator 16 of the device 12 without requiring the operator 16 to look away from a given field of view. For example, the device 12 may be a vehicle, such as an automotive vehicle or an aircraft, or may be a component, such as a helmet or eyeglasses. The head-up display system 10 may project the primary image 14 through a transparent element, such as a windshield 18 (FIG. 1), a cockpit canopy (not shown), a visor of a helmet (not shown), or a lens of eyeglasses (not shown), and may effectively manage solar load on the head-up display system 10. Further, the head-up display system 10 presents bright, crisp, and clear primary images 14 which are substantially free from visible ghosting. That is, although not shown, ghosting generally occurs when a ghost image, i.e., a secondary image that is similarly shaped to and offset or slightly displaced or spaced apart from the primary image 14, is visible to the operator 16. For example, the ghost image often appears slightly below or above the primary image 14. However, any ghost image of the present head-up display system 10 is inconspicuous or squelched so that the head-up display system 10 presents a clear primary image 14, all while managing thermal energy from sunlight such that the head-up display system 10 does not overheat during use. Further, the head-up display system 10 avoids capturing and reflecting thermal radiation from the sun into the eyes of the operator 16.

As used herein, to clarify, the ghost image is distinguished from a windshield ghost image (not shown). That is, the windshield ghost image may occur due to reflection of the primary image 14 off an outer surface of the windshield 18 and may be remedied by, for example, laminating a wedge-shaped element between inner and outer windshield layers. The ghost image discussed herein would otherwise originate from the solar load, e.g., a first solar ray 20 (FIG. 1), that reaches the head-up display system 10 during operation, as set forth in more detail below.

Referring again to FIG. 1, in one embodiment, the device 12 may be an automotive vehicle such as a passenger car or truck. Alternatively, the device 12 may be another vehicle type, such as, but not limited to, an industrial vehicle, a recreational off-road vehicle, a motorcycle, and the like. The device 12 includes the windshield 18 that may be configured for protecting the operator 16 from debris and/or moisture while the device 12 is in motion or use. The windshield 18 may be formed from a plurality of layers (not shown) that are laminated together, and the windshield 18 may separate an interior passenger compartment 22 of the device 12 from an external environment 24 in which the device 12 operates. Alternatively, for non-automotive applications, the windshield 18 may be a visor of a helmet, a lens of eyeglasses or goggles, and the like. Regardless, the device 12 may have a lowest surface 26, and the windshield 18 may be spaced apart from the lowest surface 26.

As described with continued reference to FIG. 1, the device 12 also includes an operator eyebox 28 spaced apart from the windshield 18. The operator eyebox 28 may generally correspond to an area in which a head 30 of the operator 16 may move while the operator 16 gazes ahead through the windshield 18. That is, the operator eyebox 28 may correspond to a box situated directly in front of the operator 16 through which the operator 16 may view the primary image 14 presented by the head-up display system 10 without tilting and/or rotating his head more than about 20° up, down, left, and/or right. The operator eyebox 28 has a top 32 and a bottom 34 disposed between the top 32 and the lowest surface 26 of the device 12.

Referring again to FIG. 1, the device 12 further includes the head-up display system 10. The head-up display system 10 is configured for producing only the primary image 14 visible at the windshield 18 when viewed from the operator eyebox 28 without producing the ghost image (not shown) offset from the primary image 14.

More specifically, as described with reference to FIG. 1, the head-up display system 10 may include a projector 36 configured for emitting a first ray of light 38. The first ray of light 38 may be polarized light. In particular, the first ray of light 38 may have an s-polarization state or a p-polarization state. The projector 36 may be any suitable light source arranged to emit the first ray of light 38. For example, the projector 36 may include optics to focus, magnify, refract, and/or reflect light, and may define one or more apertures (not shown). In a non-limiting example, the projector 36 may emit the first ray of light 38 from a light-emitting diode.

Referring again to FIG. 1, the head-up display system 10 may also include a lens 40 configured for reflecting the first ray of light 38 to the windshield 18. In one embodiment, the lens 40 may be characterized as a combiner and may be disposed between the operator 16 and the windshield 18. The lens 40 may redirect or refract the first ray of light 38 projected from the projector 36 in such a way so that a field of view through the windshield 18 and the primary image 14 are visible at the same time by the operator 16.

The lens 40 may be formed from a transparent dielectric material and may have a suitable thickness according to a desired application of the head-up display system 10. More specifically, the transparent dielectric material may have a refractive index at a wavelength of 588 nm of from 1.45 to 1.6. In one non-limiting embodiment, the lens 40 may be formed from polymethyl methacrylate and may have a refractive index of 1.493. In another non-limiting embodiment, the lens 40 may be formed from polycarbonate and may have a refractive index of 1.589.

As best shown in FIG. 1, the head-up display system 10 also includes a housing 42. The housing 42 may be formed from, for example, a durable plastic, and may enclose and protect various components of the head-up display system 10.

Referring now to FIGS. 2 and 3, the head-up display system 10 also includes a liquid crystal display 44 disposed within the housing 42 and configured for emitting the first ray of light 38. Although not shown, the liquid crystal display 44 may include a light source, such as a white light emitting diode. The liquid crystal display 44 may optically modulate the light source and emit the first ray of light 38, which may eventually be visible to the operator 16 as text, a diagram, an object, a shape, and the like. For example, the first ray of light 38 may be visible to the operator 16 as a speed of travel, driving directions, ambient temperature data, and the like.

The liquid crystal display 44 may include a passive matrix display arrangement or an active matrix display arrangement, i.e., a thin film transistor display arrangement. The passive matrix display arrangement may include a grid of conductors having one of a plurality of individual pixels disposed at each intersection in the grid. An electrical current may be transmitted across any two conductors to control the operation and light of any individual pixel. Alternatively, the active matrix display arrangement may include a transistor at each intersection. During operation, the liquid crystal display 44 may emit the first ray of light 38 towards a turn mirror 46, as set forth in more detail below.

Referring again to FIGS. 2 and 3, the head-up display system 10 also includes a reflector stack 48 disposed adjacent the liquid crystal display 44 within the housing 42. For example, the reflector stack 48 may abut the liquid crystal display 44 such that the liquid crystal display 44 and the reflector stack 48 do not define an air gap 50 therebetween, as shown in FIG. 2. Alternatively, the reflector stack 48 may be spaced apart from the liquid crystal display to define the air gap 50 therebetween, as shown in FIG. 3.

The reflector stack 48 is configured for transmitting therethrough the first ray of light 38 emitted by the liquid crystal display 44. The reflector stack 48 includes a retardation plate 52 and an optical film 54. The optical film 54 is disposed on the retardation plate 52 and faces the liquid crystal display 44. The retardation plate 52 may be formed from an optically transparent material and may resolve the first ray of light 38 into two orthogonal components (not shown), may retard a phase of one orthogonal component relative to the other, and may then recombine the orthogonal components into a single ray of light 38 having altered polarization characteristics.

The reflector stack 48 further includes the optical film 54 disposed on the retardation plate 52 opposite the liquid crystal display 44. In one embodiment, the optical film 54 may be a reflective polarizer film, such as the optical film 54 commercially available under the tradename Vikuiti™ Dual Brightness Enhancement Film from 3M of St. Paul, Minn. The optical film 54 may increase a brightness of the primary image 14 and may manage a polarization of the first ray of light 38 by separating polarization states, i.e., the s-polarization state and the p-polarization state, of the first ray of light 38 without absorption. That is, the optical film 54 may reflect, rather than absorb, one polarization state, e.g., the s-polarization state, as the first ray of light 38 is transmitted through the optical film 54. As such, the optical film 54 may minimize a thermal load of the head-up display system 10. Stated differently, rather than attaching the retardation plate 52 to an absorptive polarizer plate or absorptive polarizer material (not shown), the reflector stack 48 may include a reflective polarizer, i.e., the optical film 54.

As best shown in FIG. 2, the optical film 54 may also allow the reflector stack 48 to abut, be laminated to, or otherwise attach to the liquid crystal display 44 such that the air gap 50 is eliminated or minimized between the reflector stack 48 and the liquid crystal display 44. Elimination of the air gap 50 may further diminish a presence of the ghost image (not shown) and instead increase a luminance of the primary image 14 such that the head-up display system 10 only presents a crisp, bright, and clear primary image 14 that is free from the ghost image.

However, as described with continued reference to FIG. 2, since the reflector stack 48 is configured to reflect, rather than absorb, the first solar ray 20 off the reflector stack 48 as a second solar ray 56, i.e., as unwanted stray solar light, the head-up display system 10 also includes a radiative heat sink 58 disposed on the housing 42. The radiative heat sink 58 may be configured to absorb visible optical energy from the sun, i.e., the unwanted second solar ray 56 or stray light, that is reflected from the reflector stack 48. As such, elimination of the air gap 50 may not cause thermal overload or overheating of the head-up display system 10, since the second solar ray 56 may be absorbed by a radiative heat sink 58 instead of re-reflecting or transmitting to the operator eyebox 28.

The radiative heat sink 58 may be a coating disposed on and covering at least a portion of the housing 42 near the reflector stack 48 within the housing 42. As such, the radiative heat sink 58 may be formed from an energy-absorbing material, such as nanostructured graphene or aligned multiwall carbon nanotubes. In one embodiment, the radiative heat sink 58 may be formed from a plurality of carbon nanotubes each extending from the housing 42 and aligned parallel to one another. A non-limiting example of a suitable radiative heat sink 58 is commercially available under the tradename Vantablack® from Surrey NanoSystems of New Haven, United Kingdom.

As the second solar ray 56 contacts the radiative heat sink 58, the radiative heat sink 58 may absorb the thermal load and maintain a cool housing 42 even during clear, sunny operating conditions. More specifically, the second solar ray 56 may not reflect off the radiative heat sink 58 to the operator eyebox 28 during operation of the head-up display system 10. That is, as best shown in FIG. 1, the second solar ray 56 may not be visible at the windshield 18 when viewed from the top 32 of the operator eyebox 28. Therefore, the ghost image (not shown) otherwise caused by stray solar light such as the second solar ray 56 may not be present near the primary image 14. As such, the radiative heat sink 58 may be characterized as a stray light thermal manager for the head-up display system 10 and may contribute to the crisp, bright, and clear primary image 14 that is free from the ghost image. That is, the radiative heat sink 58 may control stray light from reflected solar energy.

Referring again to FIG. 2, the head-up display system 10 further includes a turn mirror 46 spaced apart from the reflector stack 48. The turn mirror 46 may be formed from a reflective material, such as glass or metal, and, as best shown in FIG. 1, may redirect the first ray of light 38 emitted by the liquid crystal display 44 towards the lens 40 for eventual display to the operator eyebox 28. In addition, the turn mirror 46 may manage and redirect the first solar ray 20. In particular, the turn mirror 46 may be configured for directing the first solar ray 20 to the reflector stack 48 such that the first solar ray 20 reflects off the reflector stack 48 to the radiative heat sink 58 as the second solar ray 56. Advantageously, the radiative heat sink 58 may absorb the second solar ray 56 such that the turn mirror 46 reflects only the first solar ray 20 and the first ray of light 38.

That is, the second solar ray 56 may not reflect off the turn mirror 46 so as to be redirected towards the operator eyebox 28. Rather, the second solar ray 56 may be directed toward the radiative heat sink 58 for absorption, while the turn mirror 46 reflects the first ray of light 38 towards the operator eyebox 28 to thereby form the primary image 14 that is free from any ghost image caused by stray solar light.

Referring now to FIG. 3, in another embodiment, the reflector stack 48 is spaced apart from the liquid crystal display 44 to define the air gap 50, as set forth above. In one aspect of this embodiment, the optical film 54 may be the reflective polarizer film described above. In another aspect of this embodiment, the optical film 54 may be a linear polarizer that is configured to linearly polarize the first solar ray 20 and the first ray of light 38. That is, the optical film 54 may be an exit polarizer that may block a portion of the light 20, 38 so that the light 20, 38 may oscillate in only one plane with respect to a direction of propagation, which may also reduce glare or stray solar light present in the housing 42.

Further, for this embodiment, the head-up display system 10 also includes a squelching material 60 disposed within the air gap 50. The squelching material 60 may be selected to squelch or suppress a portion of the solar load present as the first solar ray 20 transmits through the reflector stack 48. That is, as the turn mirror 46 reflects the first solar ray 20 towards the reflector stack 48, the second solar ray 56 may reflect off the retardation plate 52 towards the radiative heat sink 58 as set forth above, and a third solar ray 62 may propagate through the reflector stack 48 towards the liquid crystal display 44, as set forth in more detail below. The squelching material 60 may minimize additional re-reflection and propagation of the third solar ray 62 within the air gap 50.

More specifically, the squelching material 60 may be disposed on at least one of the liquid crystal display 44 and the optical film 54. For example, as shown in FIG. 3, the liquid crystal display 44 may have a first surface 64 facing the reflector stack 48 and configured for emitting the first ray of light 38. The squelching material 60 may be disposed on the first surface 64 and the optical film 54.

The squelching material 60 may be a cured film 160 formed from an anti-reflection coating composition. The cured film 160 may be disposed on the first surface 64 in any suitable manner. For example, the anti-reflection coating composition may be sprayed or rolled onto the first surface 64 and then baked to form the cured film 160. The cured film 160 may have a thickness 66 (FIG. 3) of from 35 μm to 65 μm, e.g., from 40 μm to 55 μm, or 50 μm.

Figure 4:
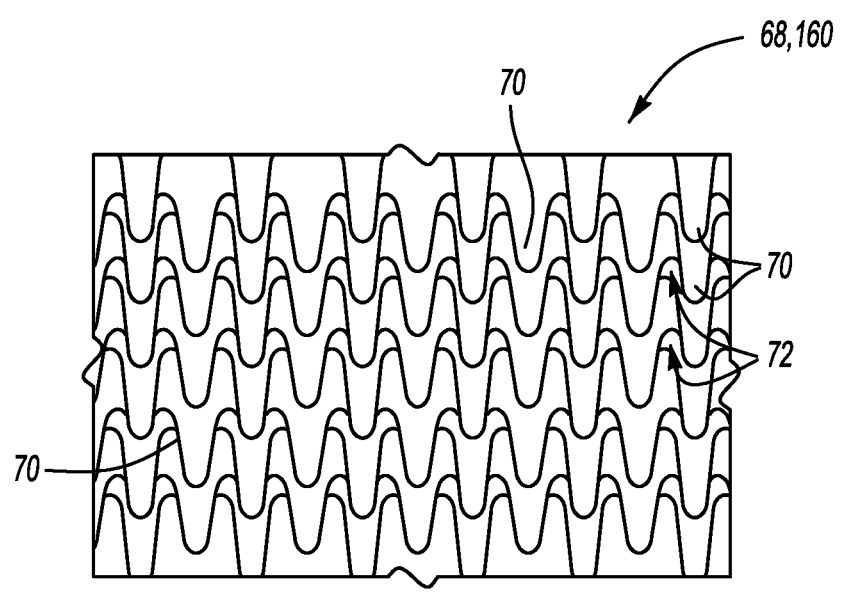
FIG. 4 is a schematic illustration of a perspective, magnified view of a portion of a cured film disposed on the liquid crystal display and reflector stack of FIG. 3.

In one non-limiting embodiment described with reference to FIG. 4, the cured film 160 may have a moth-eye structure 68 that includes a plurality of peaks 70 and a plurality of troughs 72 defined between adjacent ones of the plurality of peaks 70. That is, the moth-eye structure 68 may mimic a structure of an eye of a moth and may disrupt and minimize the reflectance of the third solar ray 62 (FIG. 3). The moth-eye structure 68 may be formed from a roll-roll embossing process such that the cured film 160 is reproducible and stable. For example, the moth-eye structure 68 may be embossed into a photopolymer using a master tool and, as such, the manufacturing process for the moth-eye structure 68 may be comparatively more stable than processes such as sputter coating, physical vapor deposition, and chemical vapor deposition.

The anti-reflection coating composition may be characterized as a 1% anti-reflection coating composition such that the cured film 160 reflects only 1% of the third solar ray 62 off the first surface 64. A non-limiting example of a suitable anti-reflection coating composition is commercially available from Dexerials Corporation of Tokyo, Japan.

The cured film 160 may also minimize reflection of the first ray of light 38 and the third solar ray 62 from the first surface 64 within the air gap 50. Stated differently, the cured film 160 may be configured for minimizing reflection of the first ray of light 38 from the first surface 64 to thereby maximize transmission of the first ray of light 38 to the turn mirror 46 and the operator eyebox 28. As such, the cured film 160 may minimize or squelch the ghost image.

That is, for embodiments including the air gap 50 and the squelching material 60, the turn mirror 46 may be configured for directing a) the first solar ray 20 to the reflector stack 48 such that the first solar ray 20 reflects off the reflector stack 48 to the radiative heat sink 58 as the second solar ray 56. The turn mirror 46 may also be configured for directing b) the third solar ray 62 through the reflector stack 48 to the squelching material 60 such that the third solar ray 62 reflects off the squelching material 60 to the radiative heat sink 58 as a fourth solar ray 74. The third solar ray 62 and the fourth solar ray 74 may be absorbed by the radiative heat sink 58 so that the stray solar light does not increase a temperature of the housing 42.

In yet another embodiment, the squelching material 60 may be an index matching gel disposed within the air gap 50 and contacting the liquid crystal display 44 and the optical film 54. The index matching gel may have an index of refraction that closely approximates an index of refraction of the optical film 54, the air gap 50, and/or the liquid crystal display 44. That is, the index matching gel may be disposed within the air gap 50 so that the third solar ray 62 and the first ray of light 38 may each pass through the index matching gel without reflection or refraction to thereby squelch the ghost image. In another example, the squelching material 60 may be a high temperature laminate formed from a polyurethane optically-clear adhesive.

Therefore, during operation of the head-up display system 10, the primary image 14 is presented through the windshield 18 as a clear, single, bright image with increased luminance. Advantageously, the ghost image may not be visible at the windshield 18 when viewed from the top 32 of the operator eyebox 28 even during operating conditions which include high solar or thermal load. That is, the head-up display system 10 presents clear, singular, bright, and crisp primary images 14 during operation and mitigates thermal load and stray light reflection from the first solar ray 20.

While the best modes for carrying out the disclosure have been described in detail, those familiar with the art to which this disclosure relates will recognize various alternative designs and embodiments for practicing the disclosure within the scope of the appended claims.

What is claimed is:

1. A head-up display system comprising:
   a housing;
   a liquid crystal display disposed within the housing and configured for emitting a first ray of light;
   a reflector stack disposed adjacent the liquid crystal display within the housing, wherein the reflector stack is configured for transmitting therethrough the first ray of light and includes:
      a retardation plate; and
      an optical film disposed on the retardation plate and facing the liquid crystal display;
   a radiative heat sink disposed on the housing; and
   a turn mirror spaced apart from the reflector stack and configured for directing a first solar ray to the reflector stack such that the first solar ray reflects off the reflector stack to the radiative heat sink as a second solar ray.

2. The head-up display system of claim 1, wherein the optical film abuts the liquid crystal display such that the liquid crystal display and the reflector stack do not define an air gap therebetween.

3. The head-up display system of claim 2, wherein the optical film is a reflective polarizer film.

4. The head-up display system of claim 1, wherein the radiative heat sink absorbs the second solar ray such that the turn mirror reflects only the first solar ray and the first ray of light.

5. The head-up display system of claim 1, wherein the radiative heat sink is formed from a plurality of carbon nanotubes each extending from the housing and aligned parallel to one another.

6. The head-up display system of claim 1, wherein the second solar ray does not reflect off the turn mirror.

7. A head-up display system comprising:
   a housing;
   a liquid crystal display disposed within the housing and configured for emitting a first ray of light;

a reflector stack disposed adjacent the liquid crystal display within the housing, wherein the reflector stack is spaced apart from the liquid crystal display to define an air gap therebetween;
wherein the reflector stack is configured for transmitting therethrough the first ray of light and includes:
a retardation plate; and
an optical film disposed on the retardation plate and facing the liquid crystal display;
a squelching material disposed within the air gap;
a radiative heat sink disposed on the housing; and
a turn mirror spaced apart from the reflector stack and configured for directing:
a first solar ray to the reflector stack such that the first solar ray reflects off the reflector stack to the radiative heat sink as a second solar ray; and
a third solar ray through the reflector stack to the squelching material such that the third solar ray reflects off the squelching material to the radiative heat sink as a fourth solar ray.

8. The head-up display system of claim 7, wherein the optical film is a reflective polarizer film.

9. The head-up display system of claim 7, wherein the optical film is a linear polarizer.

10. The head-up display system of claim 7, wherein the squelching material is an index matching gel.

11. The head-up display system of claim 7, wherein the liquid crystal display has a first surface facing the reflector stack and configured for emitting the first ray of light, and wherein the squelching material is disposed on the first surface and the optical film.

12. The head-up display system of claim 11, wherein the squelching material is a cured film formed from an anti-reflection coating composition.

13. The head-up display system of claim 12, wherein the cured film has a thickness of from 35 µm to 65 µm and has a moth-eye structure including a plurality of peaks and a plurality of troughs defined between adjacent ones of the plurality of peaks; and
further wherein the cured film is configured for minimizing reflection of the first ray of light from the first surface.

14. A device comprising;
a windshield;
an operator eyebox spaced apart from the windshield; and
a head-up display system configured for producing only a primary image visible at the windshield when viewed from the operator eyebox without producing a ghost image offset from the primary image, the head-up display system including:
a housing;
a liquid crystal display disposed within the housing and configured for emitting a first ray of light;
a reflector stack disposed adjacent the liquid crystal display within the housing, wherein the reflector stack is configured for transmitting therethrough the first ray of light and includes:
a retardation plate; and
an optical film disposed on the retardation plate and facing the liquid crystal display;
a radiative heat sink disposed on the housing; and
a turn mirror spaced apart from the reflector stack and configured for directing a first solar ray to the reflector stack such that the first solar ray reflects off the reflector stack to the radiative heat sink as a second solar ray.

15. The device of claim 14, wherein the second solar ray does not reflect off the turn mirror.

16. The device of claim 14, wherein the second solar ray does not reflect off the radiative heat sink to the operator eyebox.

17. The device of claim 14, wherein the device has a lowest surface and the operator eyebox has a top and a bottom disposed between the top and the lowest surface, and further wherein the second solar ray is not visible at the windshield when viewed from the top of the operator eyebox.

18. The device of claim 14, wherein the optical film abuts the liquid crystal display such that the liquid crystal display and the reflector stack do not define an air gap therebetween.

19. The device of claim 14, wherein the reflector stack is spaced apart from the liquid crystal display to define an air gap therebetween.

20. The device of claim 19, wherein the head-up display system further includes a squelching material disposed within the air gap.

* * * * *